(12) United States Patent
Mondri et al.

(10) Patent No.: US 8,533,446 B2
(45) Date of Patent: Sep. 10, 2013

(54) ON-DEMAND DATABASE SERVER STARTUP AND SHUTDOWN

(75) Inventors: Ron Mondri, Bellevue, WA (US); Scott Cowell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 328 days.

(21) Appl. No.: 12/817,209

(22) Filed: Jun. 17, 2010

(65) Prior Publication Data

US 2011/0314266 A1 Dec. 22, 2011

(51) Int. Cl.
*G06F 9/00* (2006.01)
*G06F 7/00* (2006.01)
*G06F 15/16* (2006.01)

(52) U.S. Cl.
USPC ............... 713/2; 713/1; 707/705; 707/802; 709/203

(58) Field of Classification Search
USPC ............... 713/1, 2; 707/705, 802; 709/203
See application file for complete search history.

(56) References Cited

U.S. PATENT DOCUMENTS

| | | | |
|---|---|---|---|
| 7,937,491 B1 * | 5/2011 | Ng ............................. | 709/238 |
| 2003/0154236 A1 | 8/2003 | Dar et al. | |
| 2005/0197819 A1 * | 9/2005 | Hopkins et al. ............... | 703/22 |
| 2007/0100845 A1 * | 5/2007 | Sattler et al. ................. | 707/100 |
| 2008/0082572 A1 | 4/2008 | Ballard et al. | |
| 2008/0208806 A1 | 8/2008 | Dalfo et al. | |
| 2008/0222628 A1 * | 9/2008 | Batra et al. .................. | 717/171 |

OTHER PUBLICATIONS

"Oracle CRM on Demand Microsoft Outlook Integration", Retrieved Apr. 6, 2010 at << http://crmondemand.oracle.com/ocom/groups/public/@crmondemand/documents/webcontent/6082_en.pdf >>, pp. 1-2.
"Extending Enterprise Applications with Microsoft Outlook: Architectural Design Guide", Retrieved at << http://msdn.microsoft.com/en-us/library/aa479348.aspx >>, Jan. 2006, pp. 14.
"Chapter 1—Starting, Pausing, and Stopping SQL Server", Retrieved at << http://technet.microsoft.com/en-us/library/cc917563.aspx >>, Retrieved Date: Apr. 6, 2010, pp. 9.
"Cannot Start Business Contact Manager because SQL Server Stopped Running", Retrieved at << http://forum.crmreports.com/topic/cannot-start-business-contact-manager-because-sql-server-stopped-running >>, Retrieved Date: Apr. 6, 2010, pp. 2.

(Continued)

*Primary Examiner* — Stefan Stoynov
(74) *Attorney, Agent, or Firm* — Hope Baldauff, LLC

(57) ABSTRACT

A database startup service is launched at the boot time of a computer that is configured to receive requests to start the execution of a database server. A business application plug-in is then started in a minimal functionality mode of operation. The plug-in determines whether an action has been performed that requires access to a database. If access to the database is needed, the plug-in transmits a request to the database startup service to start the database service. Once the database server has been started, the plug-in transitions to a full functionality mode of operation where all of the functionality provided by the plug-in is enabled. The plug-in might also determine that access to the database is no longer needed. In response thereto, the plug-in may transmit a request to the database startup service to terminate the execution of the database server.

20 Claims, 4 Drawing Sheets

(56) References Cited

OTHER PUBLICATIONS

"How to Start and Stop SQL Server Service?", Retrieved at << http://www.dotnetspider.com/tutorials/SqlServer-Tutorial-144.aspx >>, Retrieved Date: Apr. 6, 2010, pp. 2.

"Working Offline in Business Contact Manager", Retrieved at << http://office.microsoft.com/en-us/help/HA100676851033.aspx >>, Retrieved Date: Apr. 6, 2010, pp. 3.

* cited by examiner

ON-DEMAND DATABASE SERVER STARTUP AND SHUTDOWN

BACKGROUND

Certain types of business applications may be hosted within a personal information manager ("PIM") client application program. For instance, a business application plug-in may be utilized within a PIM application that provides access to customer relationship management ("CRM") data from within the PIM application. These types of plug-ins typically access data stored on a server computer and provide appropriate user interfaces for allowing a user to view, modify, and otherwise interact with the server data.

In order to provide the functionality described above, business application plug-ins might store a copy of the server data in a local database in order to enable offline access to the data and to optimize performance. Loading of the local database, however, may be costly in terms of both load-time latency and ongoing performance degradation due to system memory usage, impact on suspend and resume time, and lowered battery life in the case of portable computer users. This can be especially frustrating for users that only utilize functionality provided by the PIM application and that do not utilize functionality provided by the business application plug-in.

It is with respect to these and other considerations that the disclosure made herein is presented.

SUMMARY

Technologies are described herein for on-demand database server startup and shutdown. Through the utilization of the technologies and concepts presented herein, a database server utilized by a business application plug-in, such as a CRM plug-in, to store a copy of server data can be started and terminated on-demand. In this manner, the database server may be started only when needed, thereby reducing the performance impact for users that do not utilize the functionality provided by the plug-in. The database server may also be terminated when no longer needed, thereby reducing the performance impact previously felt following usage of the business application plug-in.

According to one aspect presented herein, a database startup service is launched at the boot time of a computer. The database startup service is configured to receive requests to start the execution of a database server. The database server maintains a database utilized by a business application plug-in, such as a CRM plug-in, which executes in conjunction with a PIM client application.

The business application plug-in is executed when the PIM client application is started. When the business application plug-in is started, it executes in a minimal functionality mode of operation. In this mode of operation, the plug-in presents a standard user interface ("UI"). However, the actual functionality provided by way of the UI is disabled in the minimal functionality mode of operation.

The business application plug-in also determines whether an action has been performed that requires access to the database. For instance, the plug-in might determine that a user has requested to view or modify information in the database. In response to determining that access to the database is needed, the plug-in transmits a request to the database startup service to cause the database server to be executed. Once the database server has been started, the plug-in transitions to a full functionality mode of operation wherein all of the functionality provided by the plug-in is enabled. The plug-in may then access the database in an appropriate manner. In this manner, the database server is started when needed.

According to another aspect, the plug-in might also determine that the PIM client application has been terminated. In response thereto, the plug-in may transmit a request to the database startup service to terminate the execution of the database server. In this manner, the operation of the database server can be terminated when access to the database is no longer needed.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
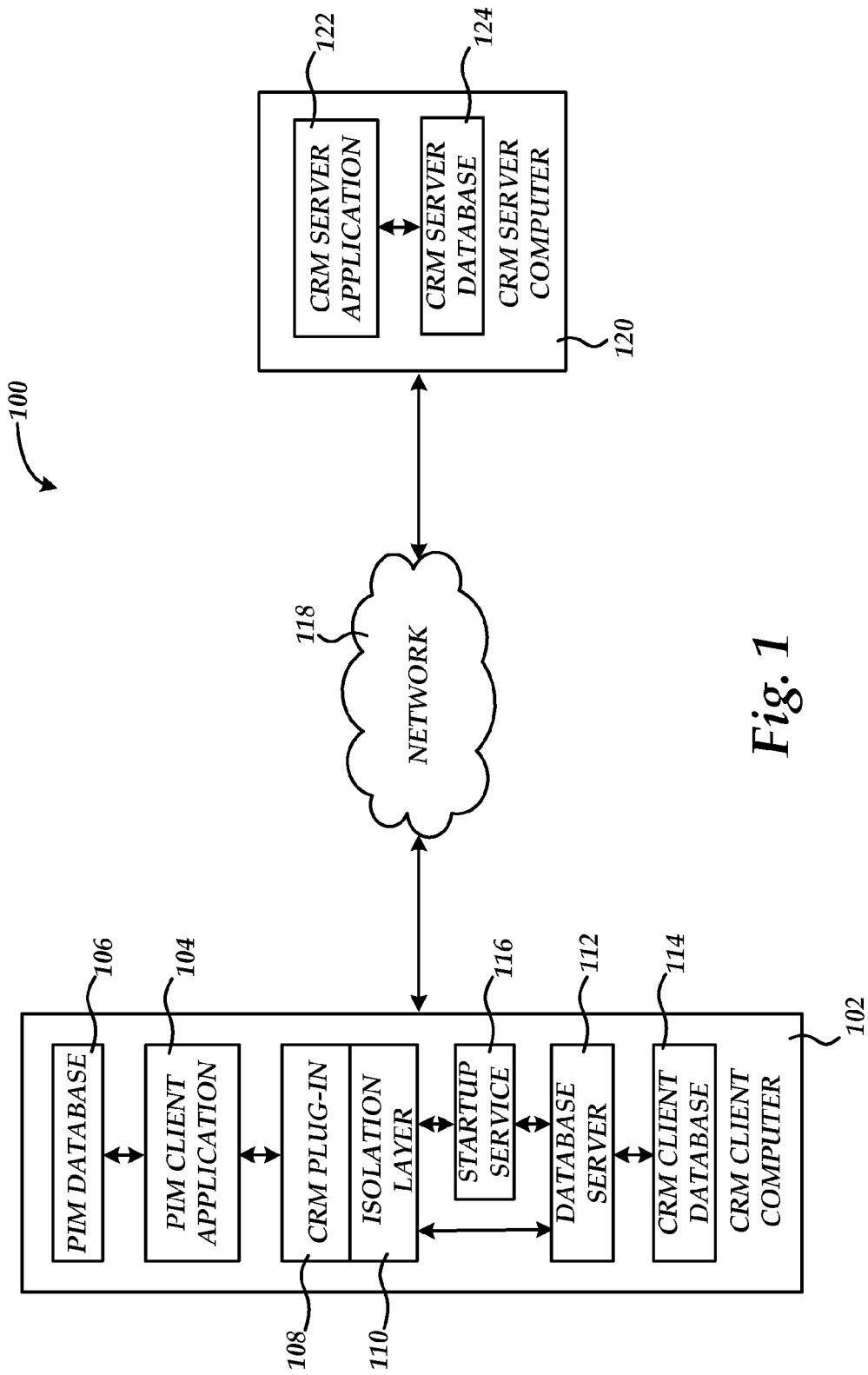
FIG. 1 is a network diagram showing one illustrative operating environment for embodiments presented herein.

The following detailed description is directed to technologies for on-demand database server startup and shutdown. A database startup service is launched at the boot time of a computer that is configured to receive requests to start the execution of a database server. A business application plug-in is then started in a minimal functionality mode of operation. The plug-in determines whether an action has been performed that requires access to a database. If access to the database is needed, the plug-in transmits a request to the database startup service to start the database service. Once the database server has been started, the plug-in transitions to a full functionality mode of operation where all of the functionality provided by the plug-in is enabled. The plug-in might also determine that access to the database is no longer needed. In response thereto, the plug-in may transmit a request to the database startup service to terminate the execution of the database server.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for on-demand database server startup and shutdown will be described.

Turning now to FIG. 1, details will be provided regarding one embodiment presented herein for on-demand database server startup and shutdown. In particular, FIG. 1 is a network diagram showing one illustrative operating environment 100 for the embodiments presented herein. As shown in FIG. 1, the environment 100 includes a CRM client computer 102 that is coupled to a CRM server computer 120 by way of a network 118. The CRM client computer 102 comprises a standard desktop, laptop, or other type of computing device configured to execute a PIM client application 104 and a CRM plug-in 108.

The PIM client application 104 comprises a program for viewing, managing, and otherwise interacting with personal information, such as electronic mail messages, contacts, a calendar, tasks, notes, to do list items, and other personal information that may be maintained by a user of the CRM client computer 102. As shown in FIG. 1, the PIM client application 104 maintains a PIM database 106 storing the personal information. The PIM client application 104 may also interact with one or more server computers that also store a database containing a user's personal information.

According to one implementation, the PIM client application 104 is configured to execute in conjunction with a CRM plug-in 108. The CRM plug-in 108 operates in conjunction with the PIM client application 104 to provide functionality for allowing a user of the CRM client computer 102 to view, modify, and otherwise interact with CRM data. CRM data refers to any data maintained by an organization that is relevant to a customer relationship. For instance, CRM data may include, but is not limited to, information regarding customers, contact with the customers, sales made to customers, customer support information, marketing information, and other types of information that may be relevant to a customer relationship or potential customer relationship. The functionality provided by the CRM plug-in 108 may be integrated with the operation of the PIM client application 104 such that a user interface provided by the CRM plug-in 108 is integrated with a user interface provided by the PIM client application 104. In this manner, a user of the CRM client computer 102 may access, view, and modify CRM data directly from within the PIM client application 104 utilizing the functionality provided by the CRM plug-in 108.

According to embodiments, the CRM plug-in 108 is configured to operate in conjunction with a CRM server application 122 executing on the CRM server computer 120. The CRM server computer 120 is a standard server computer configured to execute the CRM server application 122 and, potentially, other applications. As illustrated in FIG. 1, the CRM server application 122 maintains the CRM server database 124. The CRM server database 124 is utilized to store CRM data. Through the functionality provided by the CRM plug-in 108, a user of the CRM client computer 102 can retrieve, view, and modify data stored in the CRM server database 124.

In order to improve performance of the CRM plug-in 108, the CRM plug-in 108 is configured in one embodiment to maintain a CRM client database 114. The CRM client database 114 might comprise a local copy of a portion of the CRM database 124 that is stored at the CRM client computer 102. In another embodiment, the CRM client database 114 comprises a standalone database utilized by the CRM plug-in 108 to store CRM data. As discussed above, loading of the CRM client database 114 may be costly in terms of both load time latency and ongoing performance degradation due to system memory usage, impact on the suspend and resume time of CRM client computer 102, and lowered battery life where the CRM client computer 102 comprises a portable computer. This can be frustrating for users that only use functionality provided by the PIM client application 104 and that do not utilize functionality provided by the CRM plug-in 108.

In order to address the issue addressed above, the CRM plug-in 108 is configured in one embodiment with an isolation layer 110. The isolation layer 110 is responsible for intercepting calls from the CRM plug-in 108 to the database server 112 that maintains the CRM client database 114. In this regard, the isolation layer 110 is configured in one embodiment to call a startup service 116 to launch the database server 112 when the CRM plug-in 108 requires data from the CRM client database 114. The isolation layer 110 also isolates the CRM plug-in 108 in the case where the database server 112 is not yet available to respond to requests for data stored in the CRM client database 114. Additional details regarding this process will be provided below.

According to one implementation disclosed herein, the startup service 116 (which may be referred to herein as the "database startup service 116") is launched at the boot time of the CRM client computer 102. The startup service 116 is configured to receive requests from the isolation layer 110 to start and terminate the execution of the database server 112. As known to those skilled in the art, the database server 112 is a computer program that provides database services to other computer programs, such as the CRM plug-in 108. An example of a database server is the SQL SERVER database server application from MICROSOFT CORPORATION of Redmond, Wash. Other types of database services from other manufactures might also be utilized with the embodiment presented herein.

As discussed briefly above, the CRM plug-in 108 is executed when the PIM client application 104 is started. According to one implementation, the CRM plug-in 108 begins operation in a minimal functionality mode of operation. In this mode of operation, the CRM plug-in 108 presents a standard user interface to a user of the CRM client computer 102. For instance, the UI provided by the CRM plug-in 108 might provide user interface controls for viewing, modifying, or otherwise interacting with the data stored in the CRM client database 114. In the minimal functionality mode of operation, however, the actual functionality provided by way of the UI displayed by the CRM plug-in 108 is disabled.

The CRM plug-in 108 is also configured to determine whether an action has been performed by a user of the client computer 102 that requires access to the CRM client database 114. For instance, the CRM plug-in 108 might determine that a user has requested to view or modify information contained within the CRM database 114. In response to determining that access to the CRM client database 114 is needed, the isolation layer 110 of the CRM plug-in 108 transmits a request to the startup service 116 to cause the database server 112 to be executed. Once the database server 112 has been started, the CRM plug-in 108 transitions to a full functionality mode of operation wherein all of the functionality provided by the CRM plug-in 108 is enabled. In this way, the database server 112 and the functionality provided by the CRM plug-in is not enabled until an action is detected that requires access to the CRM client database 114.

According to another aspect of the invention, the CRM plug-in 108 might also determine that the PIM client application 104 has been terminated. In response thereto, the isolation layer 110 of the CRM plug-in 108 may transmit a request to the startup service 116 to terminate the execution of the database server 112. In this manner, the performance impact of executing the database server 112 is eliminated once the functionality provided by the database server 112 is no longer needed. It should be appreciated that the database server 112 might also be terminated after a period of inactivity. In this case, the CRM plug-in 108 might return to the minimal functionality mode of operation.

It should be appreciated that, while the embodiments described herein have been presented in the context of a CRM plug-in 108 that executes in conjunction with a CRM server application 122, the embodiments presented herein might be utilized with any business application plug-in. A business plug-in is a plug-in that operates in conjunction with a PIM client application 104 to access any kind of business data. Additionally, it should also be appreciated that the embodiments presented herein might be utilized in other types of operating environments. For instance, the functionality described herein might be utilized by a standalone application for interacting with CRM or other types of business data that does not utilize a plug-in component. Other types of implementations will also be apparent to those skilled in the art.

As shown in FIG. 1, the CRM client computer 102 and the CRM server computer 120 communicate over the network 118. The network 118 is a computing network configured for enabling data communications between the CRM client computer 102 and the CRM server computer 120. In one embodiment, the network 118 comprises the Internet, however, it should be appreciated that the network 118 may comprise any type of local area or wide area network. Additionally, the network 118 has been shown in a simplified form. Therefore, it should be appreciated that the network 118 may comprise many different networking components and computer systems distributed over a large geographic area. It should also be appreciated that although FIG. 1 illustrates only a single CRM client computer 102 and a single CRM server computer 120 being connected to the network 118, many other computing devices may also be connected to the network 118 and enabled for data communication over the network 118.

Figure 2:
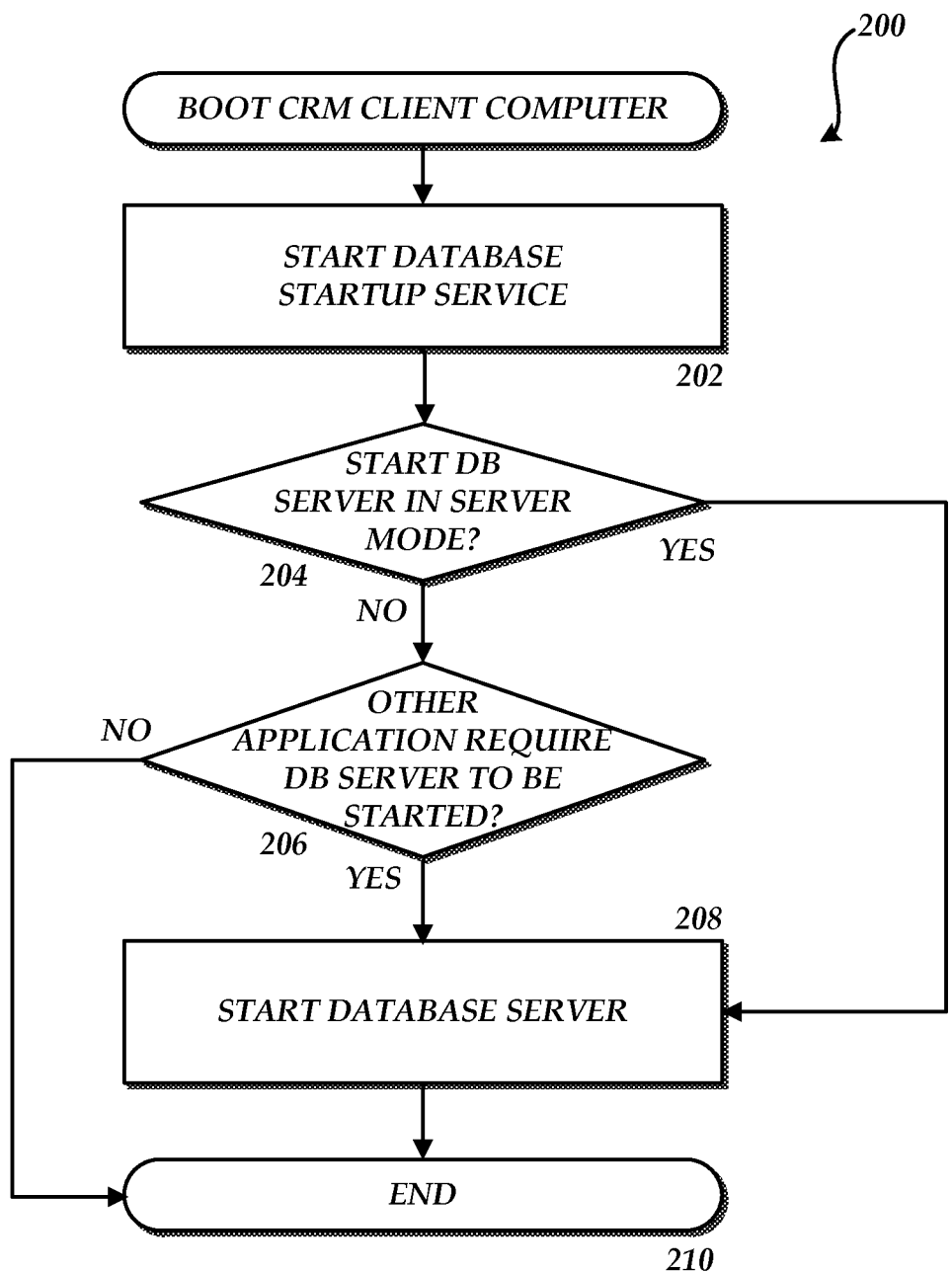
FIG. 2 is a flow diagram illustrating aspects of the boot time operation of a CRM client computer according to one embodiment disclosed herein.

Turning now to FIG. 2, additional details will be provided regarding the embodiments presented herein for on-demand database server startup and shutdown. In particular, FIG. 2 is a flow diagram showing a routine 200 that shows aspects of the operation the CRM client computer 102 in one embodiment disclosed herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where the CRM client computer 102 starts the execution of the startup service 116. As discussed above, the startup service 116 is configured to receive and respond to requests from the isolation layer 110 to start and to terminate the execution of the database server 112. According to embodiments, the startup service 116 is a lightweight service and, therefore, execution of the startup service 116 causes only a minimal performance impact on the operation of the CRM client computer 102. From operation 202, the routine 200 proceeds to operation 204.

At operation 204, the CRM client computer 102 determines at boot time whether the database server 112 should be started in a server mode of operation. In the server mode of operation, the database server 112 provides database service to programs executing on computers other than the CRM client computer 102. If the database server 112 acts as a server, it should be started at the boot time of the CRM client computer 102 to enable this functionality. Accordingly, if the database server 112 should be started in the server mode, the routine 200 proceeds to operation 208 where the database server 112 is started. From operation 208, the routine 200 then proceeds to operation 210, where it ends.

If, at operation 204, the CRM client computer 102 determines that the database server 112 does not need to be started in server mode, the routine 200 proceeds to operation 206. At operation 206, the CRM client computer 102 determines whether an application other than the PIM client application 104 requires that database server 102 to be started at boot time. For instance, an accounting program or another type of program may require the database server 112 to be started during the boot of the client computer 102. Accordingly, if another application other than the PIM client application 104 requires the database server 112 to be started at boot time, the routine 200 proceeds from operation 206 to operation 208 where the database server 112 is started. If no other applications require the database server 112 to be started, the routine 200 proceeds from operation 206 to operation 210, where it ends.

Figure 3:
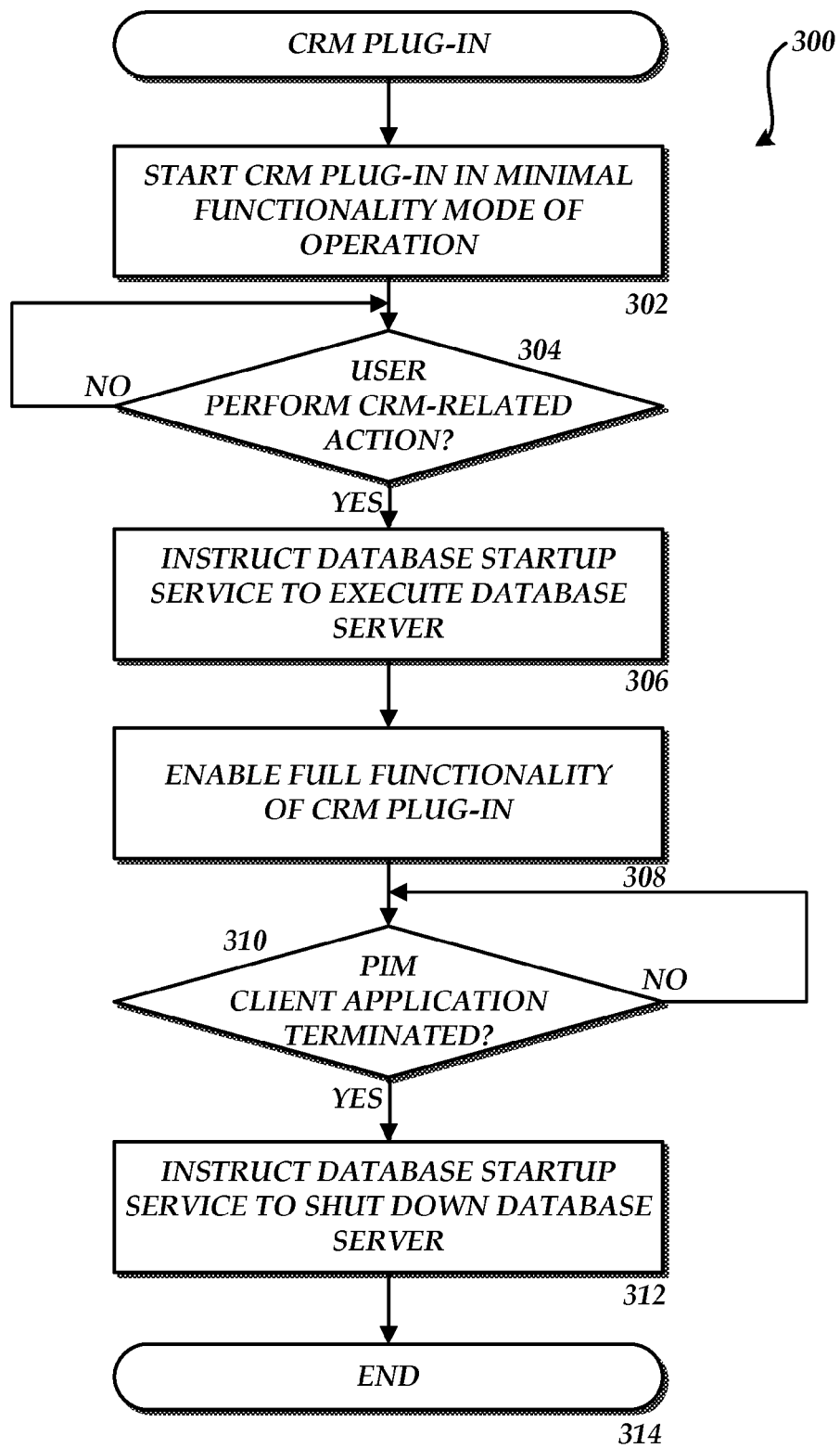
FIG. 3 is a flow diagram illustrating aspects of the operation of a CRM client plug-in according to one embodiment disclosed herein.

Referring now to FIG. 3, a flow diagram showing a routine 300 that illustrates aspects of the operation of the CRM plug-in 108 in one embodiment presented herein will be described. The routine 300 begins at operation 302, where the CRM plug-in 108 is started in the minimal functionality mode of operation. As discussed above, when in this mode of operation the CRM plug-in 108 provides its standard user interface, however, the functionality implemented behind the user interface is disabled. The CRM plug-in 108 may be started at the time the PIM client application 104 is launched by a user of the CRM client computer 102.

From operation 302, the routine 300 proceeds to operation 304 where the CRM plug-in 108 determines whether a user has performed a CRM related action. As discussed above, a CRM related action is any action that requires access to the CRM client database 114. If access to the CRM client database 114 is not needed, the routine 300 proceeds once again to operation 304 where the determination is made again. If access to the CRM client database 114 is needed, the routine 300 proceeds from operation 304 to operation 306.

At operation 306, the isolation layer 110 of the CRM plug-in 108 instructs the database startup service 116 to begin execution of the database server 112. While the database server 112 is launching, the isolation layer 110 may provide a user interface indicating that the database server 112 is being started and will be available shortly.

Once the database server 112 is executing, the routine 300 proceeds from operation 306 to operation 308 where the CRM plug-in 108 transitions to the full functionality mode of operation. As discussed above, in this mode of operation the full functionality of the CRM plug-in 108 is available to a user of the CRM client computer 102. The routine 300 then proceeds from operation 308 to operation 310 where the isolation layer 110 determines whether the PIM client application 104 has been terminated. If the PIM client application 104 has not been terminated, the routine 300 proceeds to operation 310 where another such determination is made. If, however, the PIM client application 104 has been terminated, the routine 300 proceeds from operation 310 to operation 312.

At operation 312, the isolation layer 110 instructs the database startup service 116 to terminate execution of the database server 112. In response thereto, the database server 112 discontinues its execution in an appropriate manner. From operation 312, the routine 300 proceeds to operation 314, where it ends.

Figure 4:
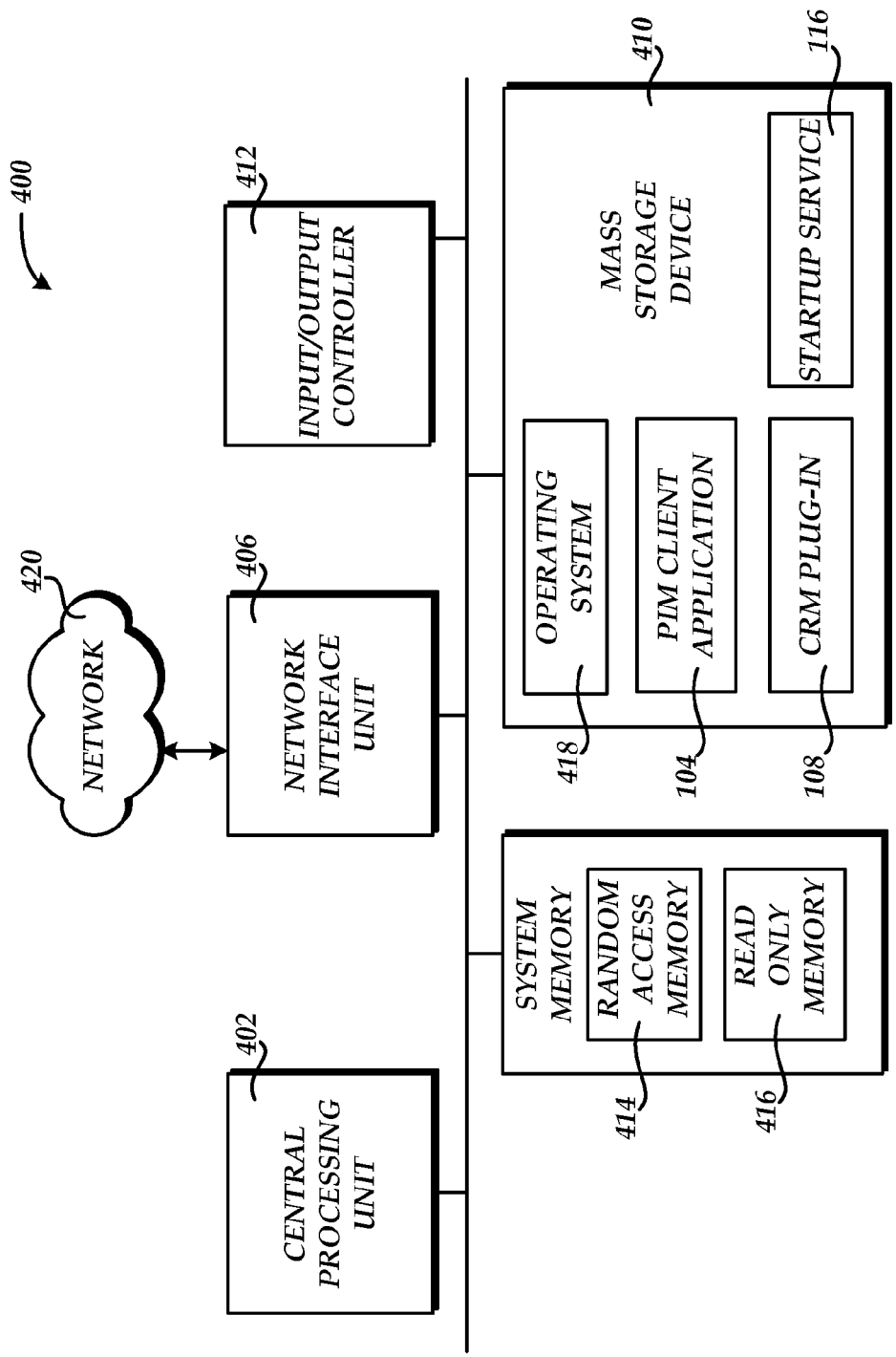
FIG. 4 is a computer architecture diagram showing an illustrative computer hardware and software architecture for a computing system capable of implementing the embodiments presented herein.

FIG. 4 shows an illustrative computer architecture for a computer 400 capable of executing the software components described herein for on-demand database server startup and shutdown. The computer architecture shown in FIG. 4 illustrates a conventional desktop, laptop computer, or server computer and may be utilized to execute the CRM plug-in 108, the startup service 116, or the CRM server application 122 described herein.

The computer architecture shown in FIG. 4 includes a central processing unit 402 ("CPU"), a system memory 408, including a random access memory 414 ("RAM") and a read-only memory ("ROM") 416, and a system bus 404 that couples the memory to the CPU 402. A basic input/output system ("BIOS") containing the basic routines that help to transfer information between elements within the computer 400, such as during startup, is stored in the ROM 416. The computer 400 further includes a mass storage device 410 for storing an operating system 418, application programs, and other program modules, which will be described in greater detail below.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable storage media can be any available computer storage media that can be accessed by the computer 400.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400. As used herein, the term computer-readable storage media does not encompass transitory signals.

According to various embodiments, the computer 400 may operate in a networked environment using logical connections to remote computers through a network such as the network 420. The computer 400 may connect to the network 420 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including an operating system 418 suitable for controlling the operation of a networked desktop, laptop, or server computer. The mass storage device 410 and RAM 414 may also store one or more program modules. In particular, the mass storage device 410 and the RAM 414 may store the CRM plug-in 108, the startup service 116, and the other program modules described above with respect to FIG. 1. The mass storage device 410 and RAM 414 may also store other program modules and data, such as the CRM client database 114.

In general, software applications or modules may, when loaded into the CPU 402 and executed, transform the CPU 402 and the overall computer 400 from a general-purpose computing system into a special-purpose computing system customized to perform the functionality presented herein. The CPU 402 may be constructed from any number of transistors or other discrete circuit elements, which may individually or collectively assume any number of states. More specifically, the CPU 402 may operate as one or more finite-state machines, in response to executable instructions contained within the software or modules. These computer-executable instructions may transform the CPU 402 by specifying how the CPU 402 transitions between states, thereby physically transforming the transistors or other discrete hardware elements constituting the CPU 402.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for on-demand database server startup and shutdown have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and storage mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for on-demand database server startup and shutdown, the method comprising performing computer implemented operations for:
   executing a local database startup service;
   receiving requests at the local database startup service to execute a remote database server;
   determining whether an action has been performed that requires access to a database maintained by the remote database server; and
   in response to determining that an action has been performed that requires access to the database, transmitting a request to the local database startup service to cause the remote database server to be executed.

2. The computer-implemented method of claim 1, wherein a plug-in executing in conjunction with a personal information management (PIM) client application program performs the determining and transmitting operations.

3. The computer-implemented method of claim 2, wherein the plug-in is executed in a minimal functionality mode of operation prior to the execution of the database server.

4. The computer-implemented method of claim 3, wherein the plug-in is executed in a full functionality mode of operation following the execution of the database server.

5. The computer-implemented method of claim 4, further comprising:
   determining whether the PIM client application has been terminated; and
   in response to determining that the PIM client application has been terminated, transmitting a request to the database startup service to cause the execution of the database server to be terminated.

6. The computer-implemented method of claim 4, wherein the database comprises a local copy of a portion of a customer relationship management (CRM) database stored at a CRM server computer.

7. The computer-implemented method of claim 4, wherein the plug-in comprises a CRM plug-in for interacting with the CRM database stored at the CRM server computer.

8. The computer-implemented method of claim 4, wherein the CRM plug-in comprises an isolation layer for interacting with the database startup service and the database server.

9. The computer-implemented method of claim 4, wherein the database startup service is executed at a boot time.

10. The computer-implemented method of claim 9, further comprising:
    determining at the boot time whether the database server should be started in a server mode of operation; and
    causing the database server to be executed in response to determining that the database server should be started in a server mode of operation.

11. A computer-readable storage medium having computer-executable instructions stored thereupon which, when executed by a computer, cause the computer to:
    execute a database startup service;
    receive requests at the database startup service to start a database server;
    start the database server in response to received requests;
    execute a customer relationship management (CRM) plug-in in conjunction with a personal information management (PIM) client application, the CRM plug-in maintaining a local CRM client database;
    determine, by way of the CRM plug-in, whether an action has been performed that requires access to the local CRM client database; and
    in response to determining that an action has been performed that requires access to the local CRM client database, to instruct the database startup service to start the database server to enable access to the local CRM client database.

12. The computer-readable storage medium of claim 11, wherein the CRM plug-in is executed in a minimal functionality mode of operation prior to starting the database server.

13. The computer-readable storage medium of claim 12, wherein the CRM plug-in is executed in a full functionality mode of operation following starting the database server.

14. The computer-readable storage medium of claim 13, having further computer-executable instructions stored thereupon which, when executed by the computer, will cause the computer to:
    determine whether the PIM client application has been terminated; and
    in response to determining that the PIM client application has been terminated, to transmit a request to the database startup service to cause the execution of the database server to be terminated.

15. The computer-readable storage medium of claim 14, wherein the local CRM client database comprises a local copy of a portion of a CRM database stored at a CRM server computer.

16. The computer-readable storage medium of claim 14, wherein the database startup service is executed at a boot time of the computer.

17. The computer-readable storage medium of claim 14, wherein the CRM plug-in comprises an isolation layer for interacting with the database startup service and the database server.

18. A computer-implemented method for on-demand database server startup and shutdown, the method comprising performing computer-implemented operations for:
    executing a database startup service at a boot time of a computer, the database startup service;
    starting the execution of a database server in response to received requests;
    executing a customer relationship management (CRM) plug-in in conjunction with a personal information management (PIM) client application, the CRM plug-in maintaining a local CRM client database that stores a portion of a CRM server database maintained by a CRM server computer;
    determining whether the CRM plug-in requires access to the local CRM client database;

in response to determining that the CRM plug-in requires access to the local CRM client database, instructing the database startup service to start the database server to enable the CRM plug-in to access the local CRM client database;

determining whether the PIM client application has been terminated; and in response to determining that the PIM client application has been terminated, transmitting a request to the database startup service to cause the execution of the database server to be terminated.

19. The computer-implemented method of claim 18, wherein the CRM plug-in is executed in a minimal functionality mode of operation prior to starting the database server.

20. The computer-implemented method of claim 19, wherein the CRM plug-in is executed in a full functionality mode of operation following starting the database server.

* * * * *